United States Patent
Fan et al.

(10) Patent No.: US 11,642,631 B2
(45) Date of Patent: May 9, 2023

(54) ION EXCHANGE RESIN AND METHOD FOR PREPARING THE SAME

(71) Applicant: INDUSTRIAL TECHNOLOGY RESEARCH INSTITUTE, Hsinchu (TW)

(72) Inventors: Hsu-Tzu Fan, Taoyuan (TW); Su-Mei Chen Wei, Hsinchu (TW); Yi-Che Su, Zhubei (TW); Hsin-Ju Yang, Taichung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 440 days.

(21) Appl. No.: 17/077,208

(22) Filed: Oct. 22, 2020

(65) Prior Publication Data
US 2021/0121832 A1    Apr. 29, 2021

Related U.S. Application Data

(60) Provisional application No. 62/924,808, filed on Oct. 23, 2019.

(30) Foreign Application Priority Data

Dec. 24, 2019  (TW) .................. 108147341

(51) Int. Cl.
| | | |
|---|---|---|
| *B01D 71/82* | (2006.01) | |
| *C08G 59/14* | (2006.01) | |
| *C08G 63/91* | (2006.01) | |
| *C08K 5/3492* | (2006.01) | |
| *C08K 5/13* | (2006.01) | |

(52) U.S. Cl.
CPC .......... *B01D 71/82* (2013.01); *C08G 59/1411* (2013.01); *C08G 63/91* (2013.01); *C08K 5/13* (2013.01); *C08K 5/34922* (2013.01); *B01D 2323/30* (2013.01); *B01D 2325/42* (2013.01)

(58) Field of Classification Search
CPC .......................... B01D 71/82; B01D 2323/30; B01D 2325/42; C08G 59/1411; C08G 63/91; C08K 5/34; C08K 5/13
USPC .......................................................... 521/27
See application file for complete search history.

(56) References Cited

U.S. PATENT DOCUMENTS

| | | | | | |
|---|---|---|---|---|---|
| 4,847,334 | A * | 7/1989 | Thompson | ............ | C09D 11/102 528/277 |
| 5,322,885 | A * | 6/1994 | Kuo | .................... | C09D 167/00 523/501 |
| 7,737,224 | B2 * | 6/2010 | Willis | ........................ | C08F 8/36 526/287 |
| 8,030,414 | B2 * | 10/2011 | Haring | ................ | H01M 8/1025 525/348 |
| 8,357,749 | B2 * | 1/2013 | Malotky | .................... | C08J 3/05 524/576 |
| 9,861,941 | B2 * | 1/2018 | Willis | ........................ | C08F 8/36 |
| 10,022,680 | B2 * | 7/2018 | Willis | ................ | H01M 8/1023 |
| 2006/0231487 | A1 | 10/2006 | Bartley et al. | | |
| 2011/0195263 | A1 * | 8/2011 | Malotky | .................... | C08J 3/05 428/480 |

FOREIGN PATENT DOCUMENTS

| | | |
|---|---|---|
| CN | 1210094 C | 7/2005 |
| CN | 103275568 A | 9/2013 |
| CN | 102380257 B | 11/2013 |
| CN | 105473648 A | 4/2016 |
| CN | 106084683 A | 11/2016 |
| CN | 106459719 A | 2/2017 |
| JP | 5-112612 A | 5/1993 |
| JP | 2000-80166 A | 3/2000 |
| JP | 2014-51632 A | 3/2014 |
| TW | 297042 | 2/1997 |
| TW | 318855 | 11/1997 |
| WO | WO 2008/140119 A1 | 11/2008 |

OTHER PUBLICATIONS

Taiwanese Office Action, issued for the corresponding Taiwanese Application No. 108147341, dated Jul. 29, 2020.
Chinese Office Action and Search Report for Chinese Application No. 202010123536.8, dated Apr. 19, 2022.
Song et al., "Synthesis and Application of Waterbore Polyurethane with Sulfonic/ Carboxylic Groups for ABS Plastic Coatings", Paint & Coatings Industry; vol. 46, No. 11, Nov. 2016, pp. 1-6, with an English abstract.

* cited by examiner

*Primary Examiner* — Michael M. Bernshteyn
(74) *Attorney, Agent, or Firm* — Birch, Stewart, Kolasch & Birch, LLP

(57) ABSTRACT

An ion exchange resin and a method for preparing the same are provided. An ion exchange resin is formed by a composition, and the composition includes a crosslinking agent and an ionic compound with sulfonate ions. The ionic compound with sulfonate ions is formed by reacting an epoxy resin with an ionic monomer with sulfonate ions or an ionic polymer having sulfonate ions. The ionic monomer and the ionic polymer each has a hydroxyl group or an acid group at the ends. The ionic monomer or the ionic polymer is 40 to 80 parts by weight, and the epoxy resin is 15 to 25 parts by weight, based on 100 parts by weight of the ion exchange resin. An ion exchange resin with a network structure is formed after the ionic compound with sulfonate ions reacts with the crosslinking agent.

17 Claims, No Drawings

ION EXCHANGE RESIN AND METHOD FOR PREPARING THE SAME

CROSS REFERENCE TO RELATED APPLICATIONS

This application claims the benefit of U.S. Provisional Application No. 62/924,808, filed on Oct. 23, 2019, which is hereby incorporated herein by reference.

This application claims the benefit of Taiwan Application No. 108147341, filed on Dec. 24, 2019, the disclosure of which is hereby incorporated by reference herein in its entirety.

TECHNICAL FIELD

The technical field relates to an ion exchange resin, and a method for preparing the same.

BACKGROUND

The demand for water has increased in recent years, due in part to the rapid development of industries that employ large quantities of water. Also, global climate change and the increasing frequency of extreme climate events can seriously affect the distribution of water resources, making drought conditions more severe. Due to increasing global demand for freshwater, developing new water resources and increasing the use of regenerated water are urgent goals. The development of various emerging technologies of water regeneration is also a priority in water resource development in every country. Among these, water desalination is the most important and practical goal, and continues to flourish. The main technology used in water desalination relies on membrane performance. If the key technologies of membranes can be mastered, the performance of the water regeneration and desalination module system can be controlled. Therefore, developing new membrane materials with low energy consumption and high desalination efficiency has become a trend in the development of future technologies.

Electrodialysis (ED) technology is a technology of thin-film separation driven by an electric field. Under the influence of an external electric field, the movement of ions in the water is driven by a positive direct current and a negative direct current. The cations (positive ions) and anions (negative ions) in the water are separated through the cation exchange membrane and the anion exchange membrane. Electrodialysis technology has fewer requirements and operation conditions, fewer procedures for pretreatment, lower energy consumption and equipment costs, simpler maintenance, and uses fewer chemicals. In membrane desalination technology, since water does not pass through the electrodialysis system's membrane by pressure, the operating pressure of the electrodialysis system can be lower than that of other membrane systems. It is also less likely to cause fouling in the membrane than other systems that use pressure. Accordingly, electrodialysis has been widely used in different fields for different purposes, such as desalination, concentration and purification. Also, electrodialysis reversal (EDR) is a technology that further modifies the electrodialysis. In each EDR system, there are two electrodes on the outer side which are submerged in a watery salt solution that is able to conduct electrical current and allows for an electrical field to be placed around the system. The salt solution is pumped around in order to maintain the ion balance. Because a salt solution (feed current) is also found between the ion exchange membranes, the electrical field will result in ion transport. In the spaces between electrodes, the cations will diffuse through the cation-selective membrane to the negative electrode (cathode) while the anions will diffuse through the anion-selective membrane to the positive electrode (anode). EDR is advantageous in that it offers very high water recovery due to its use of polarity reversal, which allows for treatment without chemicals. It also involves feeds with concentrated salt scale factors that are well beyond saturation, thereby extending the lifespan of the membrane. EDR is mainly used in the desalination of brine, acid concentration, and the removal of minerals. Because of its remarkable effect on ion removal, many companies have successively used EDR systems to treat wastewater containing metals.

In the desalination process using an EDR system, more ions would be introduced to the membrane for maintaining high-performance electrochemical properties of the EDR system. However, more ions introduced to the membrane can cause excessive swelling of the membrane, low membrane strength, and low chemical resistance. Accordingly, the EDR system cannot offer good performance or good membrane properties. Also, the water-swellable membrane in the EDR module has poor dimension stability, and it is easily swelled and deformed after a period of operation. Therefore, there will be water leakage in the EDR module during operation. As a result, desalination efficiency is reduced, water flux is insufficient, and operation may have to be discontinued.

Therefore, the development of membrane material (e.g., for fabricating an ion exchange membrane) with low swelling properties and improved ion exchange performance is one of the most important goals for the industry.

SUMMARY

Some embodiments of the present disclosure provide an ion exchange resin, wherein the ion exchange resin is formed by a composition, and the composition includes a crosslinking agent and an ionic compound with sulfonate ions. The ionic compound with sulfonate ions is formed by reacting an epoxy resin with an ionic monomer sulfonate ions or an ionic polymer having sulfonate ions, wherein the ionic monomer and the ionic polymer each has a hydroxyl group or an acid group at one end. The ionic monomer or the ionic polymer is 40 to 80 parts by weight, and the epoxy resin is 15 to 25 parts by weight, based on 100 parts by weight of the ion exchange resin. Also, an ion exchange resin has a cross-linked structure such as a network structure.

Some embodiments of the present disclosure provide a method for preparing an ion exchange resin. The method includes mixing a solvent, an epoxy resin, and an ionic monomer sulfonate ions or an ionic polymer having sulfonate ions to form a mixture, and the mixture is reacted by heating to form a first mixed solution, wherein the ionic monomer and the ionic polymer each has a hydroxyl group or an acid group at one end, and the first mixed solution comprises an ionic compound having sulfonate ions. Also, the ionic monomer or the ionic polymer is 40 to 80 parts by weight, and the epoxy resin is 15 to 25 parts by weight, based on 100 parts by weight of the ion exchange resin. The method further includes mixing the first mixed solution and a crosslinking agent to form a second mixed solution, and performing a crosslinking reaction to form an ion exchange resin having a network structure.

A detailed description is given in the following embodiments with reference to the accompanying drawings.

DETAILED DESCRIPTION

Embodiments provide an ion exchange resin and a method for preparing the ion exchange resin. According to the embodiments of the disclosure, an ion exchange resin is formed by a composition, wherein the composition includes a crosslinking agent and an ionic compound with sulfonate ions, wherein the ionic compound with sulfonate ions is formed by reacting an epoxy resin with an ionic monomer having sulfonate ions or an ionic polymer having sulfonate ions. Also, the ionic monomer and the ionic polymer each has a hydroxyl group or an acid group at one end. In some embodiments, the ionic monomer or the ionic polymer having sulfonate ions is reacted with the epoxy resin to form an ionic compound having several crosslinking points; then, the ionic compound having several crosslinking points is reacted with a crosslinking agent to form an ion exchange resin having a network structure. Accordingly, films including the ion exchange resin in accordance with some embodiments have improved properties of chemical resistance. Moreover, the aforementioned ionic monomer or the ionic polymer has sulfonate ions, which are suitable as a material for an ion exchange membrane. Accordingly, in some embodiments, the ionic monomer or the ionic polymer directly reacts with other monomers to form the ionic compound (i.e., the ions are distributed at the polymer chains). That is, the ionization is achieved before forming the ionic compound. Therefore, the ion exchange resin and methods for preparing the same according to the embodiments can form films with excellent properties. For example, the films as formed have smooth and intact appearances, and pass several chemical resistance tests. For example, the embodied hardened film was dipped in a saline solution, an acidic aqueous solution or an alkaline aqueous solution for 24 hours. The results show that no substance was eluted in the solution or no color change of the solution was observed. Particularly, the films including the ion exchange resin in the embodiments have extremely low swellability; for example, the swelling ratios of the films are no more than 1%. In some embodiments, the films fabricated by the methods provided herein has swelling ratios lower than 0.5%. Also, the film fabricated by the method of the embodiment has an excellent permselectivity and good desalination efficiency in electrodialysis (ED). Therefore, the films including the ion exchange resin in the embodiments are suitable for use as ion exchange membranes, and those films would not be easily swelled and deformed during operation of the ED module.

According to some embodiments of the disclosure, an ion exchange resin and a method for preparing the same are provided in the following descriptions.

According to the embodiments of the disclosure, the disclosure provides an ion exchange resin. The ion exchange resin formed by a composition, and the composition includes a crosslinking agent and an ionic compound with sulfonate ions. In some embodiments, the ionic compound with sulfonate ions is formed by reacting an epoxy resin with an ionic monomer or an ionic polymer having sulfonate ions, wherein the ionic monomer and the ionic polymer each has a hydroxyl group or an acid group at one end. Also, the ion exchange resin has a cross-linked structure, such as a network structure.

According to some embodiments of the disclosure, the ionic monomer or the ionic polymer is 40 to 80 parts by weight, and the epoxy resin is 15 to 25 parts by weight, based on 100 parts by weight of the ion exchange resin. Also, in some embodiments, and the crosslinking agent is 5 to 15 parts by weight, based on 100 parts by weight of the ion exchange resin.

According to some embodiments of the disclosure, an ionic monomer or an ionic polymer having sulfonate ions and having a hydroxyl group or an acid group at one end thereof is reacted with an epoxy resin to form an ionic compound. In some embodiments, the ionic polymer has a structure represented by Formula (I):

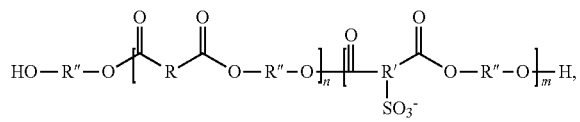

Formula (I)

wherein R, R' and R" are independently $C_1$-$C_8$ alkyl group, $C_1$-$C_8$ cycloalkyl group, $C_1$-$C_{10}$ phenyl group, $C_1$-$C_8$ alkoxy group, $C_1$-$C_8$ alkoxyalkyl group, $C_1$-$C_8$ phenoxyalkane group, or $C_1$-$C_8$ alcohol ether, m is a positive integer from 1 to 500 and n is a positive integer from 1 to 500. In this example, the ionic polymer in the structure represented by Formula (I) is 40 to 80 parts by weight, the epoxy resin is 15-25 parts by weight, and the crosslinking agent is 5-15 parts by weight, based on 100 parts by weight of the ion exchange resin.

According to some embodiments of the disclosure, the ionic polymer is a sulfonated polyester having a hydroxyl group or an acid group at the end. In some embodiments, the sulfonated polyester has a number average molecular weight (Mn) from 5,000 to 15,000. For example, the sulfonated polyester has a number average molecular weight (Mn) from 5,000 to 14,000. In some embodiments, the sulfonated polyester has a number average molecular weight (Mn) from 5,000 to 13,000. In some embodiments, the sulfonated polyester has a number average molecular weight (Mn) from 5,000 to 12,000. In some embodiments, the sulfonated polyester has a number average molecular weight (Mn) from 5,000 to 11,000. In some embodiments, the sulfonated polyester has a number average molecular weight (Mn) from 5,000 to 10,000. In some embodiments, the sulfonated polyester has a number average molecular weight (Mn) from 5,000 to 9,000. When the number average molecular weight of the sulfonated polyester is too high, a coating solution prepared by this sulfonated polyester may have a high viscosity, and it may affect the processability of the coating solution. When the number average molecular weight of the sulfonated polyester is too low, a film formed by the ion exchange resin may have poor physical properties. However, the ranges of the number average molecular weight (Mn) of the sulfonated polyester as described above are provided for exemplification, not limiting the scope of the disclosure. The number average molecular weight (Mn) of the sulfonated polyester can be determined and adjusted to satisfy the physical properties required for products in the applications.

According to some embodiments of the disclosure, the ionic monomer or the ionic polymer as described above is formed by reacting a diol, triol or a combination thereof with an anhydride or dioic acid.

According to some embodiments of the disclosure, the diol or triol as described above is ethylene glycol, propylene glycol, butanediol, pentanediol, neopentyl glycol, glycol, diethylene glycol, trimethylolpropane, cyclohexanedimethanol, a combination thereof, or other suitable diol or triol.

According to some embodiments of the disclosure, the anhydride as described above is maleic anhydride, phthalic anhydride, 1,2,4-cyclohexanetricarboxylic anhydride, pyromellitic dianhydride, terephthalic acid, malonic acid, trimellitic anhydride, a combination thereof, or other suitable anhydrides.

According to some embodiments of the disclosure, the epoxy resin, which is reacted with an ionic monomer or an ionic polymer having sulfonate ions (wherein the ionic monomer and the ionic polymer each has a hydroxyl group or an acid group at the end), has two or more functional groups. In some embodiments, an ionic monomer or an ionic polymer is reacted with an epoxy resin to form an ionic compound having several crosslinking points. Then, the ionic compound having several crosslinking points is reacted with a crosslinking agent, the ion exchange resin as formed has a network structure with higher density, thereby increasing the chemical resistances of a film including the ion exchange resin.

In some embodiments, an epoxy resin having three functional groups has a structure represented by Formula (II):

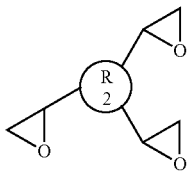

Formula (II)

In some embodiments, an ionic compound having several crosslinking points, formed by reacting an ionic monomer or an ionic polymer with an epoxy resin having three functional groups, has a structure represented by Formula (III):

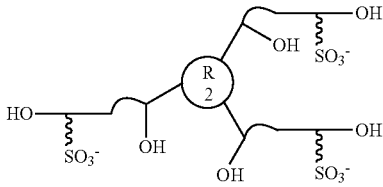

Formula (III)

According to some embodiments of the disclosure, the epoxy resin, which is reacted with the ionic monomer or the ionic polymer as described above, has an epoxy equivalent in a range of 150 g/eq to 800 g/eq. In some other embodiments, the epoxy resin has an epoxy equivalent in a range of 150 g/eq to 750 g/eq. In some other embodiments, the epoxy resin has an epoxy equivalent in a range of 150 g/eq to 700 g/eq. In some other embodiments, the epoxy resin has an epoxy equivalent in a range of 150 g/eq to 650 g/eq. In some other embodiments, the epoxy resin has an epoxy equivalent in a range of 150 g/eq to 600 g/eq. In some other embodiments, the epoxy resin has an epoxy equivalent in a range of 150 g/eq to 550 g/eq. In some other embodiments, the epoxy resin has an epoxy equivalent in a range of 150 g/eq to 500 g/eq. In some other embodiments, the epoxy resin has an epoxy equivalent in a range of 150 g/eq to 450 g/eq. In some other embodiments, the epoxy resin has an epoxy equivalent in a range of 150 g/eq to 400 g/eq. In some other embodiments, the epoxy resin has an epoxy equivalent in a range of 150 g/eq to 350 g/eq. In some other embodiments, the epoxy resin has an epoxy equivalent in a range of 150 g/eq to 300 g/eq. In some other embodiments, the epoxy resin has an epoxy equivalent in a range of 150 g/eq to 250 g/eq.

According to some embodiments of the disclosure, the crosslinking agent as described above is a phenol-based crosslinking agent, an amino-based crosslinking agent, a diisocyanate-based crosslinking agent, or a combination thereof. In some embodiments, the amino-based crosslinking agent is a melamine based crosslinking agent, primary ammonium salt, secondary ammonium salt, or a combination thereof.

Additionally, according to some embodiments of the disclosure, the crosslinking agent as described above has two or more functional groups. The crosslinking agent can be reacted with the ionic compound having sulfonate ions as formed above to form an ion exchange resin with a network structure, thereby increasing the chemical resistance of the ion exchange resin.

In some embodiments, when the ionic compound having several crosslinking points formed as described above is reacted with a crosslinking agent, the ion exchange resin as formed has a network structure. It can be represented by Formula (IV):

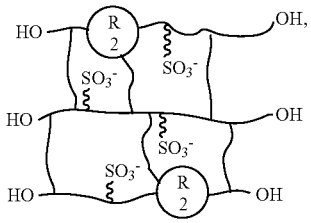

Formula (IV)

wherein the ions are distributed at the polymer chains.

According to some embodiments of the disclosure, a method for preparing an ion exchange resin is provided. First, a solvent, an epoxy resin and an ionic monomer or an ionic polymer having sulfonate ions are mixed to form a mixture, and the mixture is reacted by heating to form a first mixed solution. The ionic monomer and the ionic polymer each has a hydroxyl group or an acid group at one end, and the first mixed solution comprises an ionic compound having sulfonate ions. Epoxy resin is introduced to increase the number of crosslinking points. Then, the method for preparing the ion exchange resin further includes mixing the first mixed solution and a crosslinking agent to form a second mixed solution, and performing a crosslinking reaction to form the ion exchange resin having a network structure.

In some embodiments, materials of the ionic monomer, the ionic polymer or the epoxy resin have been described above and not repeated herein. In some embodiments, the solvent is N,N-Dimethyl acetamid (DMAC) or any other suitable solvent.

One of the methods for preparing an ion exchange resin is described below for exemplification.

In some embodiments, a diol or triol, an anhydride as described above and a solvent are mixed to form a mixture. Then, the mixture is heated to a first temperature to conduct a reaction, thereby forming a solution containing an ionic polymer. In some embodiments, the first temperature is within a range of about 100° C. to about 140° C., such as about 130° C. The ionic polymer as obtained in the solution has a hydroxyl group or an acid group at its end, and the ionic polymer has sulfonate ions.

Next, epoxy resin and a suitable solvent are mixed, followed by adding the solution containing the ionic polymer, and then a mixture as formed is heated to a second temperature to conduct a reaction, thereby forming a first mixed solution. In some embodiments, the second temperature is lower than the first temperature. In some embodiments, the second temperature is within a range of about 80° C. to about 100° C., such as about 90° C. After the reaction, the solution is cooled at room temperature, and the first mixed solution contains the ionic polymer having several crosslinking points.

Next, the first mixed solution as described above and a crosslinking agent are mixed, such as by stirring, to form a second mixed solution. The second mixed solution contains a composition for forming an ion exchange resin, and may have a solid content of about 40%-60%. In some embodiments, a coagent can be added to mix with the first mixed solution and the crosslinking agent. The coagent can be a polymer-based coagent, a polyether modified organic silicone-based coagent, or a combination thereof. Finally, an ion exchange resin is formed by subjecting the second mixed solution to a crosslinking reaction at room temperature or heating the second mixed solution to conduct the crosslinking reaction.

Hereinafter, one of the methods for preparing an ion exchange resin according to some embodiments of the disclosure is described below by taking an example in which a sulfonated polyester having a hydroxyl group or an acid group at the end of the molecular structure reacts with an epoxy resin and a crosslinking agent. In some embodiments, the sulfonated polyester having a structure represented by Formula (I) first is reacted with an epoxy resin to form an ionic compound with sulfonate ions, and the reaction is expressed below:

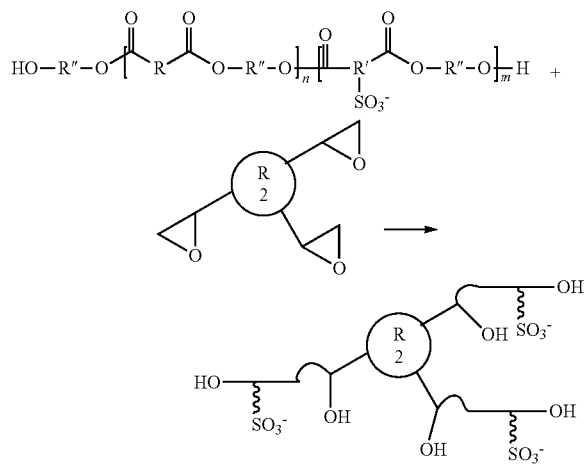

Next, in some embodiments, the ionic compound having sulfonate ions is reacted with a crosslinking agent (represented by a symbol of " ") to form an ion exchange resin having a network structure, and the reaction is expressed below:

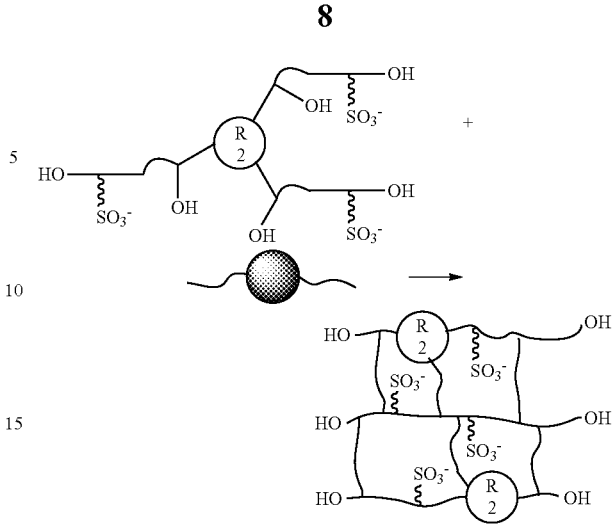

According to some embodiments of the disclosure, the ionic monomer or ionic polymer having sulfonate ions is suitable for making an ion exchange resin film. The introduction of the epoxy resin improves the chemical resistance of the ion exchange resin film and forms an ionic compound having several crosslinking points. Afterwards, the ionic compound having several crosslinking points is reacted with the crosslinking agent to form a network structure after the crosslinking reaction has been completed. Accordingly, the ion exchange resin as made may have advantages of original materials, improving the strength and the chemical resistance of the film, decreasing the water swellability of the film, and maintaining superior permselectivity (wherein the term "permselectivity" is used to define the preferential permeation of certain ionic species through ion-exchange membranes).

According to some embodiments of the disclosure, an ion exchange resin film is also disclosed. The ion exchange resin film further includes a substrate and the ion exchange resin as described above. In some embodiments, the substrate is a fiberglass cloth or other suitable materials, such as any material suitable for dipping and coating a solution containing an ion exchange resin.

In some embodiments, the first mixed solution as obtained and a crosslinking agent are mixed to form a second mixed solution, and a crosslinking reaction is performed to form an ion exchange resin having a network structure. After the crosslinking reaction, the second mixed solution includes the ion exchange resin having a solid content of about 40%-60%. Afterwards, a substrate is provided, and the second mixed solution is coated on the substrate, and a curing process such as a baking process is performed to form a cured film. Therefore, the cured film as fabricated above includes the ion exchange resin of some embodiments.

In some embodiments, the baking process as described above can be performed in two stages at different temperatures. For example, the second mixed solution is coated on the substrate, and the first stage is performed by continuously heating the substrate at a third temperature for a period of time. Then, the second stage is performed by heating the substrate at a fourth temperature for another period of time, thereby forming a cured film containing the ion exchange resin of some embodiments. In some embodiments, the fourth temperature is higher than the third temperature. For example, the substrate coated or dipped in the second mixed solution is baked at 150° C. (i.e., the third temperature) for about 10 minutes, followed by baking at 180° C. (i.e., the fourth temperature) for about 30 minutes. It should be noted that the applicable range for the third temperature, the applicable range for the fourth temperature, and the thermal energy accumulated on the film after the two-stage baking process should not affect the structure or properties of the ion exchange resin.

According to the embodiments of the disclosure, an ion exchange resin as prepared or a film including the ion exchange resin has low water swellability and can be applied in the electrodialysis (ED) field. For example, the film including the ion exchange resin in the embodiments can be used as a cation exchange membrane of an electrodialysis (ED) module to solve the problem of high water swellability of current ion exchange membranes, thereby improving the performance of the ion exchange membrane and increasing the desalination efficiency.

Below, exemplary embodiments and comparative examples will be provided for describing the preparation of the ion exchange resin in detail, so that the embodiments would be easily realized by a person having ordinary knowledge in the art. However, the inventive concept may be embodied in various forms without being limited to the exemplary embodiments set forth herein. The ion exchange resin compositions of the examples are also cured to form films containing the ion exchange resin, respectively. Also, several tests are performed on those films for analyzing the properties of the films.

Additionally, the methods for analyzing the properties of each of the films are described below. Therefore, the methods for analyzing the properties of the films in the embodied examples and comparative examples would not be redundantly repeated.

Chemical Resistance (pH2 Test and pH12 Test)

A sample having a size of 4 cm×1 cm was immersed into an HCl aqueous solution of pH2. Then, the integrity of the film on the sample was observed by the naked eyes; the color of the HCl aqueous solution changes was also observed.

A sample having a size of 4 cm×1 cm was immersed into a NaOH aqueous solution of pH12. Then, the integrity of the film on the sample was observed by the naked eyes; the color of the NaOH aqueous solution changes was also observed.

Swelling Ratio (%)

A straight line of about 3 cm was drawn on a sample having a size of 4 cm×1 cm. The length of the straight line on the sample was measured by a vernier caliper and then recorded precisely as an indication of dry film size. Next, the sample was immersed into a 0.5 M NaCl solution for 24 hours, and the sample was then taken out of the NaCl solution. The straight line's length was measured and recorded as a wet film size after the removal of extra water on the sample by tissue paper. Accordingly, the difference between the straight line's length on the dry film and that on the wet film is defined as the swelling ratio. The calculation of the swelling ratio is expressed by the equation below.

Swelling ratio (%)=[(length of the straight line on the wet film-length of the straight line on the dry film)/(length of the straight line on the dry film)]*100%.

Permselectivity (%)

A sample having a size of 3 cm×3 cm was immersed into a 0.5 M NaCl solution for 24 hours. Then, extra water on the sample was removed using tissue paper before measurement. Permselectivity measurement was carried out on a Biologic SP300 (BioLogic Science Instrument).

Electrodialysis (ED) Test—Desalination Efficiency (%)

A sample was placed in a small-scale electrodialysis (ED) module using 1,000 mg/L of NaCl (aq) for conducting desalination test, and a reservoir using 1,200 mg/L of $Na_2SO_4$ (aq) for cyclic voltammetry is provided, wherein an effective area of an ion exchange membrane is 192 $cm^2$, and a sweep rate is 3 cm/sec. Conductivity in high-concentration and low-concentration desalination compartments as measured varies over time, and desalination efficiency is expressed by the equation below.

Desalination efficiency (%)=(initial conductivity in the low-concentration compartment−conductivity in the low-concentration compartment after two hours)/initial conductivity in the low-concentration compartment*100%.

Example 1

70 parts by weight of sulfonated polyester having a hydroxyl group or an acid group at the end (AQ48, available from Eastman), 2 parts by weight of ethylene glycol and 102.5 parts by weight of N,N-Dimethyl acetamid (DMAC) were mixed to form a mixture. Then, 7.72 parts by weight of benzene-1,2,4,5-tetracarboxylic dianhydride (PMDA) was added into the mixture to form a solution. The solution was heated to 130° C. for 3 hours to react and form a solution containing an ionic compound (i.e., the first Intermediate). Then, the solution containing the ionic compound was cooled to 90° C.

Next, 20 parts by weight of epoxy resin (epoxy equivalent EEW=215 g/eq) was dissolved in 20 parts by weight of N,N-Dimethyl acetamid (DMAC), followed by adding the solution containing the ionic compound (i.e., the first Intermediate) to form a solution. The solution was heated to 90° C. to react for 2 hours, and then cooled to room temperature, thereby obtaining a first mixed solution. This first mixed solution was a homogeneous solution of an alkyd resin, which was a dark amber liquid in a fluid state.

Then, 0.85 g of a phenol-based crosslinking agent (PR722, available from Allnex) and an adequate amount of a coagent (e.g., a combination of a polymer-based coagent and a polyether modified organic silicone-based coagent added to facilitate coating) were added into 10 g of the first mixed solution (dark amber liquid) to form a mixture, and then the mixture was stirred for a while to form a second mixed solution. The second mixed solution included an ion exchange resin, and had a solid content of about 40%-60%.

Next, a fiberglass cloth having a thickness of about 90 μm was dipped in the second mixed solution (4.9 cm/min coating rate of the dip coating machine), followed by baking at about 150° C. for 10 minutes and at about 180° C. for 30 minutes, thereby forming a cured film containing an ion exchange resin.

Afterwards, several tests (including observations and measurements) were performed on the cured film fabricated by the method in Example 1. The test results are shown in Table 1 and described as follows:

(1) the cured film formed in Example 1 was observed by the naked eyes, and the appearance of the cured film was smooth and reflected a sheen;

(2) the salt absorption rate was about 7.11% (the cured film was dipped in a 0.5M saline solution for 24 hours), and no eluted substance was observed in the 0.5M saline solution;

(3) the swelling ratio was about 0.2%;

(4) the permselectivity was about 97.2%;

(5) the cured film formed in Example 1 was dipped in 0.01M NaOH aqueous solution (pH12) for 24 hours, wherein the color of the 0.01M NaOH aqueous solution did not change and no eluted substance was observed in the 0.01M NaOH aqueous solution; additionally, the cured film formed in Example 1 was dipped in 1M NaOH aqueous solution (pH12) for 24 hours, wherein the color of the 1M NaOH aqueous solution did not change and no eluted substance was observed in the 1M NaOH aqueous solution; and (6) the cured film formed in Example 1 was dipped in 0.01M HCl aqueous solution (pH2) for 24 hours, wherein the color of the 0.01M HCl aqueous solution did not change and no eluted substance was observed in the 0.01M HCl aqueous solution.

Accordingly, the cured film containing the ion exchange resin fabricated by the method in Example 1 is an intact film without any defect and also passes the tests of chemical resistance. For example, the cured film was dipped in a saline solution, an acidic aqueous solution or an alkaline aqueous solution for 24 hours, and the results show that no substance was eluted in the solution or no color change of the solution was observed. Additionally, the cured film fabricated by the method in Example 1 has an extremely low swelling ratio of 0.2%, which has a property of low swellability. Also, the cured film fabricated by the method in Example 1 has an excellent permselectivity and good desalination efficiency in electrodialysis (ED). Therefore, the cured film fabricated by the method in Example 1 is suitable for use as an ion exchange membrane, and it is not easily swelled and deformed during operation of the ED module.

Example 2

80 parts by weight of sulfonated polyester having a hydroxyl group or an acid group at the end (AQ55S, available from Eastman), 2 parts by weight of ethylene glycol and 107 parts by weight of N,N-Dimethyl acetamid (DMAC) were mixed to form a mixture. Then, 1.93 parts by weight of benzene-1,2,4,5-tetracarboxylic dianhydride (PMDA) was added into the mixture to form a solution. The solution was heated to 130° C. for 3 hours to react and form a solution containing an ionic compound (i.e., the first Intermediate). Then, the solution containing the ionic compound was cooled to 90° C.

Next, 18 parts by weight of epoxy resin (epoxy equivalent EEW=215 g/eq) was dissolved in 25 parts by weight of N,N-Dimethyl acetamid (DMAC), followed by adding the solution containing the ionic compound (i.e. the first Intermediate) to form a solution. The solution was heated to 90° C. to react for 2 hours, and then cooled to room temperature, thereby obtaining a first mixed solution. This first mixed solution was a homogeneous solution of an alkyd resin, which was a dark amber liquid in a fluid state.

Then, 0.85 g of a phenol-based crosslinking agent (PR722, available from Allnex) and an adequate amount of a coagent (e.g. a combination of a polymer-based coagent and a polyether modified organic silicone-based coagent added to facilitate coating) were added into 10 g of the first mixed solution (dark amber liquid) to form a mixture, and then the mixture was stirred for a while to form a second mixed solution. The second mixed solution included an ion exchange resin, and had a solid content of about 40%-60%.

Next, a fiberglass cloth having a thickness of about 90 μm was dipped in the second mixed solution (4.9 cm/min coating rate of the dip coating machine), followed by baking at about 150° C. for 10 minutes and at about 180° C. for 30 minutes, thereby forming a cured film containing an ion exchange resin.

Afterwards, several tests (including observations and measurements) were performed on the cured film fabricated by the method in Example 2. The test results are shown in Table 1 and described as follows:

(1) the cured film formed in Example 2 was observed by the naked eyes, and the appearance of the cured film was smooth and reflected a sheen;

(2) the salt absorption rate was about 1.55% (the hardened film was dipped in a 0.5M saline solution for 24 hours), and no eluted substance was observed in the 0.5M saline solution;

(3) the swelling ratio was about 0.43%;

(4) the permselectivity was about 93.9%;

(5) the cured film formed in Example 2 was dipped in 0.01M NaOH aqueous solution (pH12) for 24 hours, wherein the color of the 0.01M NaOH aqueous solution did not change and no eluted substance was observed in the 0.01M NaOH aqueous solution; additionally, the cured film formed in Example 2 was dipped in 1M NaOH aqueous solution (pH12) for 24 hours, wherein the color of the 1M NaOH aqueous solution did not change and no eluted substance was observed in the 1M NaOH aqueous solution; and (6) the cured film formed in Example 2 was dipped in 0.01M HCl aqueous solution (pH2) for 24 hours, wherein the color of the 0.01M HCl aqueous solution did not change and no eluted substance was observed in the 0.01M HCl aqueous solution.

Accordingly, the cured film containing the ion exchange resin fabricated by the method in Example 2 is an intact film without any defect and also passes the tests of chemical resistance. For example, the cured film was dipped in a saline solution, an acidic aqueous solution or an alkaline aqueous solution for 24 hours, and the results show that no substance was eluted in the solution or no color change of the solution was observed. Additionally, the cured film fabricated by the method in Example 2 has an extremely low swelling ratio of 0.43%, which has a property of low swellability. Also, the cured film fabricated by the method in Example 2 has an excellent permselectivity and good desalination efficiency in electrodialysis (ED). Therefore, the cured film fabricated by the method in Example 2 is suitable for use as an ion exchange membrane, and it is not easily swelled and deformed during operation of the ED module.

Example 3

80 parts by weight of sulfonated polyester having a hydroxyl group or an acid group at the end (AQ55S, available from Eastman), 2 parts by weight of ethylene glycol and 107 parts by weight of N,N-Dimethyl acetamid (DMAC) were mixed to form a mixture. Then, 1.93 parts by weight of benzene-1,2,4,5-tetracarboxylic dianhydride (PMDA) was added into the mixture to form a solution. The solution was heated to 130° C. for 3 hours to react and form a solution containing an ionic compound (i.e., the first Intermediate). Then, the solution containing the ionic compound was cooled to 90° C.

Next, 18 parts by weight of epoxy resin (epoxy equivalent EEW=215 g/eq) was dissolved in 25 parts by weight of N,N-Dimethyl acetamid (DMAC), followed by adding the solution containing the ionic compound (i.e. the first Intermediate) to form a solution. The solution was heated to 90° C. to react for 2 hours, and then cooled to room temperature, thereby obtaining a first mixed solution. This first mixed solution was a homogeneous solution of an alkyd resin, which was a dark amber liquid in a fluid state.

Then, 0.64 g of an amino-based crosslinking agent (melamine) (Cymel 1158-Melamine, available from Allnex) and an adequate amount of a coagent (e.g. a combination of a polymer-based coagent and a polyether modified organic silicone-based coagent added to facilitate coating) were added into 10 g of the first mixed solution (dark amber liquid) to form a mixture, and then the mixture was stirred for a while to form a second mixed solution. The second mixed solution included an ion exchange resin, and had a solid content of about 40%-60%.

Next, a fiberglass cloth having a thickness of about 90 μm was dipped in the second mixed solution (4.9 cm/min coating rate of the dip coating machine), followed by baking at about 150° C. for 10 minutes and at about 180° C. for 30 minutes, thereby forming a cured film containing an ion exchange resin.

Afterwards, several tests (including observations and measurements) were performed on the cured film fabricated by the method in Example 3. The test results are shown in Table 1 and described as follows:

(1) the cured film formed in Example 3 was observed by the naked eyes, and the appearance of the cured film was smooth and reflected a sheen;

(2) the salt absorption rate was about 2.54% (the cured film was dipped in a 0.5M saline solution for 24 hours), and no eluted substance was observed in the 0.5M saline solution;

(3) the swelling ratio was about 0.26%;

(4) the permselectivity was about 93%;

(5) the cured film formed in Example 3 was dipped in 0.01M NaOH aqueous solution (pH12) for 24 hours, wherein the color of the 0.01M NaOH aqueous solution did not change and no eluted substance was observed in the 0.01M NaOH aqueous solution; and (6) the cured film formed in Example 3 was dipped in 0.01M HCl aqueous solution (pH2) for 24 hours, wherein the color of the 0.01M HCl aqueous solution did not change and no eluted substance was observed in the 0.01M HCl aqueous solution.

Accordingly, the cured film containing the ion exchange resin fabricated by the method in Example 3 is an intact film without any defect and also passes the tests of chemical resistance. For example, the cured film was dipped in a saline solution, an acidic aqueous solution or an alkaline aqueous solution for 24 hours, and the results show that no substance was eluted in the solution or no color change of the solution was observed. Additionally, the cured film fabricated by the method in Example 3 has an extremely low swelling ratio of 0.26%, which has a property of low swellability. Also, the cured film fabricated by the method in Example 3 has an excellent permselectivity and good desalination efficiency in electrodialysis (ED). Therefore, the cured film fabricated by the method in Example 3 is suitable for use as an ion exchange membrane, and it is not easily swelled and deformed during operation of the ED module.

Example 4

88 parts by weight of sulfonated polyester having a hydroxyl group or an acid group at the end (AQ48, available from Eastman), 2 parts by weight of ethylene glycol and 119 parts by weight of N,N-Dimethyl acetamid (DMAC) were mixed to form a mixture. Then, 3.10 parts by weight of benzene-1,2,4,5-tetracarboxylic dianhydride (PMDA) was added into the mixture to form a solution. The solution was heated to 130° C. for 3 hours to react and form a solution containing an ionic compound (i.e., the first Intermediate). Then, the solution containing the ionic compound was cooled to 90° C.

Next, 5 parts by weight of epoxy resin (epoxy equivalent EEW=177 g/eq) was dissolved in 5 parts by weight of N,N-Dimethyl acetamid (DMAC), followed by adding the solution containing the ionic compound (i.e., the first Intermediate) to form a solution, and the solution was heated to 90° C. to react for 1 hours. Then, 17 parts by weight of epoxy resin (epoxy equivalent EEW=180 g/eq) dissolved in 17 parts by weight of N,N-Dimethyl acetamid (DMAC) was further added into the solution, and this solution was heated to 90° C. to react for 2 hours and then cooled to room temperature, thereby obtaining a first mixed solution. This first mixed solution was a homogeneous solution of an alkyd resin, which was a dark amber liquid in a fluid state.

Then, 0.83 g of an amino-based crosslinking agent (melamine)(Cymel 1158-Melamine, available from Allnex) and an adequate amount of a coagent (e.g. a combination of a polymer-based coagent and a polyether modified organic silicone-based coagent added to facilitate coating) were added into 10 g of the first mixed solution (dark amber liquid) to form a mixture, and then the mixture was stirred for a while to form a second mixed solution. The second mixed solution included an ion exchange resin, and had a solid content of about 40%-60%.

Next, a fiberglass cloth having a thickness of about 90 μm was dipped in the second mixed solution (4.9 cm/min coating rate of the dip coating machine), followed by baking at about 150° C. for 10 minutes and at about 180° C. for 30 minutes, thereby forming a cured film containing an ion exchange resin.

Afterwards, several tests (including observations and measurements) were performed on the cured film fabricated by the method in Example 4. The test results are shown in Table 1 and described as follows:

(1) the cured film formed in Example 4 was observed by the naked eyes, and the appearance of the cured film was smooth and reflected a sheen;

(2) the salt absorption rate was about 5.77% (the cured film was dipped in a 0.5M saline solution for 24 hours), and no eluted substance was observed in the 0.5M saline solution;

(3) the swelling ratio was about 0.1%;

(4) the permselectivity was about 92.7%;

(5) the cured film formed in Example 4 was dipped in 0.01M NaOH aqueous solution (pH12) for 24 hours, wherein the color of the 0.01M NaOH aqueous solution did not change and no eluted substance was observed in the 0.01M NaOH aqueous solution; and (6) the cured film formed in Example 4 was dipped in 0.01M HCl aqueous solution (pH2) for 24 hours, wherein the color of the 0.01M HCl aqueous solution did not change and no eluted substance was observed in the 0.01M HCl aqueous solution.

Accordingly, the cured film containing the ion exchange resin fabricated by the method in Example 4 is an intact film without any defect and also passes the tests of chemical resistance. For example, the cured film was dipped in a saline solution, an acidic aqueous solution or an alkaline aqueous solution for 24 hours, and the results show that no substance was eluted in the solution or no color change of the solution was observed. Additionally, the cured film fabricated by the method in Example 4 has an extremely low swelling ratio of 0.1%, which has a property of low swellability. Also, the cured film fabricated by the method in Example 4 has an excellent permselectivity and good desalination efficiency in electrodialysis (ED). Therefore, the cured film fabricated by the method in Example 4 is suitable for use as an ion exchange membrane, and it is not easily swelled and deformed during operation of the ED module.

Example 5

70 parts by weight of sulfonated polyester having a hydroxyl group or an acid group at the end (AQ48, available from Eastman), 2 parts by weight of ethylene glycol and 119 parts by weight of N,N-Dimethyl acetamid (DMAC) were mixed to form a mixture. Then, 3.10 parts by weight of benzene-1,2,4,5-tetracarboxylic dianhydride (PMDA) was added into the mixture to form a solution. The solution was heated to 130° C. for 3 hours to react and form a solution containing an ionic compound (i.e., the first Intermediate). Then, the solution containing the ionic compound was cooled to 90° C.

Next, 5 parts by weight of epoxy resin (epoxy equivalent EEW=350 g/eq) was dissolved in 5 parts by weight of N,N-Dimethyl acetamid (DMAC), followed by adding the solution containing the ionic compound (i.e., the first Intermediate) to form a solution, and the solution was heated to 90° C. to react for 1 hours. Then, 17 parts by weight of epoxy resin (epoxy equivalent EEW=180 g/eq) dissolved in 17 parts by weight of N,N-Dimethyl acetamid (DMAC) was further added into the solution, and this solution was heated to 90° C. to react for 2 hours and then cooled to room temperature, thereby obtaining a first mixed solution. This first mixed solution was a homogeneous solution of an alkyd resin, which was a dark amber liquid in a fluid state.

Then, 0.85 g of an amino-based crosslinking agent (melamine)(Cymel 1158-Melamine, available from Allnex) and an adequate amount of a coagent (e.g. a combination of a polymer-based coagent and a polyether modified organic silicone-based coagent added to facilitate coating) were added into 10 g of the first mixed solution (dark amber liquid) to form a mixture, and then the mixture was stirred for a while to form a second mixed solution. The second mixed solution included an ion exchange resin, and had a solid content of about 40%-60%.

Next, a fiberglass cloth having a thickness of about 90 μm was dipped in the second mixed solution (4.9 cm/min coating rate of the dip coating machine), followed by baking at about 130° C. for 5 minutes, about 150° C. for 5 minutes and at about 180° C. for 60 minutes, thereby forming a cured film containing an ion exchange resin.

Afterwards, several tests (including observations and measurements) were performed on the cured film fabricated by the method in Example 5. The test results are shown in Table 1 and described as follows:

(1) the cured film formed in Example 5 was observed by the naked eyes, and the appearance of the cured film was smooth and reflected a sheen;

(2) the salt absorption rate was about 15.54% (the cured film was dipped in a 0.5M saline solution for 24 hours);

(3) the cured film formed in Example 5 was dipped in 0.01M NaOH aqueous solution (pH12) for 24 hours, wherein the color of the 0.01M NaOH aqueous solution did not change and no eluted substance was observed in the 0.01M NaOH aqueous solution; additionally, the cured film formed in Example 5 was dipped in 1M NaOH aqueous solution (pH12) for 24 hours, wherein the color of the 1M NaOH aqueous solution did not change and no eluted substance was observed in the 1M NaOH aqueous solution; and (4) the cured film formed in Example 5 was dipped in 0.01M HCl aqueous solution (pH2) for 24 hours, wherein the color of the 0.01M HCl aqueous solution did not change and no eluted substance was observed in the 0.01M HCl aqueous solution.

Accordingly, the cured film containing the ion exchange resin fabricated by the method in Example 5 is an intact film without any defect and also passes the tests of chemical resistance. For example, the cured film was dipped in a saline solution, an acidic aqueous solution or an alkaline aqueous solution for 24 hours, and the results show that no substance was eluted in the solution or no color change of the solution was observed. Therefore, the cured film fabricated by the method in Example 5 is suitable for use as an ion exchange membrane.

Example 6

88 parts by weight of sulfonated polyester having a hydroxyl group or an acid group at the end (AQ55S, available from Eastman), 2 parts by weight of ethylene glycol and 107 parts by weight of N,N-Dimethyl acetamid (DMAC) were mixed to form a mixture. Then, 2.98 parts by weight of benzene-1,2,4,5-tetracarboxylic dianhydride (PMDA) was added into the mixture to form a solution. The solution was heated to 130° C. for 3 hours to react and form a solution containing an ionic compound (i.e., the first Intermediate). Then, the solution containing the ionic compound was cooled to 90° C.

Next, 12 parts by weight of epoxy resin (epoxy equivalent EEW=177 g/eq) was dissolved in 12 parts by weight of N,N-Dimethyl acetamid (DMAC), followed by adding the solution containing the ionic compound (i.e., the first Intermediate) to form a solution, and the solution was heated to 90° C. to react for 1 hours. Then, 5.6 parts by weight of epoxy resin (epoxy equivalent EEW=180 g/eq) dissolved in 5.6 parts by weight of N,N-Dimethyl acetamid (DMAC) was further added into the solution, and this solution was heated to 90° C. to react for 2 hours and then cooled to room temperature, thereby obtaining a first mixed solution. This first mixed solution was a homogeneous solution of an alkyd resin, which was a dark amber liquid in a fluid state.

Then, 0.52 g of an amino-based crosslinking agent (melamine)(Cymel 303LF, available from Allnex) and an adequate amount of a coagent (e.g. a combination of a polymer-based coagent and a polyether modified organic silicone-based coagent added to facilitate coating) were added into 10 g of the first mixed solution (dark amber liquid) to form a mixture, and then the mixture was stirred for a while to form a second mixed solution. The second mixed solution included an ion exchange resin, and had a solid content of about 40%-60%.

Next, a fiberglass cloth having a thickness of about 90 μm was dipped in the second mixed solution (4.9 cm/min coating rate of the dip coating machine), followed by baking at about 130° C. for 5 minutes, about 150° C. for 5 minutes and at about 180° C. for 30 minutes, thereby forming a cured film containing an ion exchange resin.

Afterwards, several tests (including observations and measurements) were performed on the cured film fabricated by the method in Example 6. The test results are shown in Table 1 and described as follows:

(1) the cured film formed in Example 5 was observed by the naked eyes, and the appearance of the cured film was smooth and reflected a sheen;

(2) the salt absorption rate was about 14.65% (the cured film was dipped in a 0.5M saline solution for 24 hours);

(3) the cured film formed in Example 5 was dipped in 0.01M NaOH aqueous solution (pH12) for 24 hours, wherein the color of the 0.01M NaOH aqueous solution did not change and no eluted substance was observed in the 0.01M NaOH aqueous solution; and (4) the cured film formed in Example 5 was dipped in 0.01M HCl aqueous solution (pH2) for 24 hours, wherein the color of the 0.01M HCl aqueous solution did not change and no eluted substance was observed in the 0.01M HCl aqueous solution.

Accordingly, the cured film containing the ion exchange resin fabricated by the method in Example 6 is an intact film without any defect and also passes the tests of chemical resistance. For example, the cured film was dipped in a saline solution, an acidic aqueous solution or an alkaline aqueous solution for 24 hours, and the results show that no substance was eluted in the solution or no color change of the solution was observed. Therefore, the cured film fabricated by the method in Example 6 is suitable for use as an ion exchange membrane.

Example 7

88 parts by weight of sulfonated polyester having a hydroxyl group or an acid group at the end (AQ55S, available from Eastman), 2 parts by weight of ethylene glycol and 120 parts by weight of N,N-Dimethyl acetamid (DMAC) were mixed, followed by adding 2.3 parts by weight of BES-Na (CAS 66992-27-6) to form a mixture. Then, 2.42 parts by weight of benzene-1,2,4,5-tetracarboxylic dianhydride (PMDA) was added into the mixture to form a solution. The solution was heated to 130° C. for 3 hours to react and form a solution containing an ionic compound (i.e., the first Intermediate). Then, the solution containing the ionic compound was cooled to 90° C.

Next, 12 parts by weight of epoxy resin (epoxy equivalent EEW=177 g/eq) was dissolved in 12 parts by weight of N,N-Dimethyl acetamid (DMAC), followed by adding the solution containing the ionic compound (i.e., the first Intermediate) to form a solution, and the solution was heated to 90° C. to react for 1 hours. Then, 5 parts by weight of epoxy resin (epoxy equivalent EEW=180 g/eq) dissolved in 5 parts by weight of N,N-Dimethyl acetamid (DMAC) was further added into the solution, and this solution was heated to 90° C. to react for 2 hours and then cooled to room temperature, thereby obtaining a first mixed solution. This first mixed solution was a homogeneous solution of an alkyd resin, which was a dark amber liquid in a fluid state.

Then, 0.52 g of an amino-based crosslinking agent (melamine)(Cymel 303LF, available from Allnex) and an adequate amount of a coagent (e.g. a combination of a polymer-based coagent and a polyether modified organic silicone-based coagent added to facilitate coating) were added into 10 g of the first mixed solution (dark amber liquid) to form a mixture, and then the mixture was stirred for a while to form a second mixed solution. The second mixed solution included an ion exchange resin, and had a solid content of about 40%-60%.

Next, a fiberglass cloth having a thickness of about 90 μm was dipped in the second mixed solution (4.9 cm/min coating rate of the dip coating machine), followed by baking at about 130° C. for 5 minutes, about 150° C. for 5 minutes and at about 180° C. for 30 minutes, thereby forming a cured film containing an ion exchange resin.

Afterwards, several tests (including observations and measurements) were performed on the cured film fabricated by the method in Example 7. The test results are shown in Table 1 and described as follows:

(1) the cured film formed in Example 7 was observed by the naked eyes, and the appearance of the cured film was smooth and reflected a sheen;

(2) the salt absorption rate was about 10.87% (the hardened film was dipped in a 0.5M saline solution for 24 hours);

(3) the cured film formed in Example 7 was dipped in 0.01M NaOH aqueous solution (pH12) for 24 hours, wherein the color of the 0.01M NaOH aqueous solution did not change and no eluted substance was observed in the 0.01M NaOH aqueous solution; additionally, the cured film formed in Example 7 was dipped in 1M NaOH aqueous solution (pH14) for 24 hours, wherein the color of the 1M NaOH aqueous solution did not change and no eluted substance was observed in the 1M NaOH aqueous solution; and (4) the cured film formed in Example 7 was dipped in 0.01M HCl aqueous solution (pH2) for 24 hours, wherein the color of the 0.01M HCl aqueous solution did not change and no eluted substance was observed in the 0.01M HCl aqueous solution; additionally, the cured film formed in Example 7 was dipped in 1M HCl aqueous solution (pH0) for 24 hours, wherein the color of the 1M HCl aqueous solution did not change and no eluted substance was observed in the 1M HCl aqueous solution.

Accordingly, the cured film containing the ion exchange resin fabricated by the method in Example 7 is an intact film without any defect and also passes the tests of chemical resistances. For example, the cured film was dipped in a saline solution, an acidic aqueous solution or an alkaline aqueous solution for 24 hours, and the results show that no substance was eluted in the solution or no color change of the solution was observed. Therefore, the cured film fabricated by the method in Example 7 is suitable for use as an ion exchange membrane.

Example 8

50 parts by weight of sulfonated polyester having a hydroxyl group or an acid group at the end (AQ55S, available from Eastman) and 69.5 parts by weight of N,N-Dimethyl acetamid (DMAC) were mixed to form a mixture. Then, 1.32 parts by weight of benzene-1,2,4,5-tetracarboxylic dianhydride (PMDA) was added into the mixture to form a solution. The solution was heated to 130° C. for 3 hours to react and form a solution containing an ionic compound (i.e., the first Intermediate). Then, the solution containing the ionic compound was cooled to 90° C.

Next, 30 parts by weight of epoxy resin (epoxy equivalent EEW=650 g/eq) was dissolved in 30 parts by weight of N,N-Dimethyl acetamid (DMAC), followed by adding the solution containing the ionic compound (i.e., the first Intermediate) to form a solution The solution was heated to 90° C. to react for 2 hours, and then cooled to room temperature, thereby obtaining a first mixed solution. This first mixed solution was a homogeneous solution of an alkyd resin, which was a dark amber liquid in a fluid state.

Then, 0.81 g of an amino-based crosslinking agent (melamine)(Cymel 303LF, available from Allnex) and an adequate amount of a coagent (e.g. a combination of a polymer-based coagent and a polyether modified organic silicone-based coagent added to facilitate coating) were added into 10 g of the first mixed solution (dark amber liquid) to form a mixture, and then the mixture was stirred for a while to form a second mixed solution. The second mixed solution included an ion exchange resin, and had a solid content of about 40%-60%.

Next, a fiberglass cloth having a thickness of about 90 μm was dipped in the second mixed solution (4.9 cm/min coating rate of the dip coating machine), followed by baking at about 150° C. for 10 minutes and at about 180° C. for 30 minutes, thereby forming a cured film containing an ion exchange resin.

Afterwards, several tests (including observations and measurements) were performed on the cured film fabricated by the method in Example 8. The test results are shown in Table 1 and described as follows:

(1) the cured film formed in Example 8 was observed by the naked eyes, and the appearance of the cured film was smooth and reflected a sheen;

(2) the salt absorption rate was about 3.18% (the cured film was dipped in a 0.5M saline solution for 24 hours); and (3) the cured film formed in Example 8 was dipped in 0.01M NaOH aqueous solution (pH12) for 24 hours, wherein the color of the 0.01M NaOH aqueous solution did not change and no eluted substance was observed in the 0.01M NaOH aqueous solution.

Accordingly, the cured film containing the ion exchange resin fabricated by the method in Example 8 is an intact film without any defect and also passes the tests of chemical resistance. For example, the cured film was dipped in a saline solution or an alkaline aqueous solution for 24 hours, and the results show that no substance was eluted in the solution or no color change of the solution was observed. Therefore, the cured film fabricated by the method in Example 8 is suitable for use as an ion exchange membrane.

Example 9

4.8 g of epoxy resin (epoxy equivalent EEW=650 g/eq) with a solid content of about 50 W % was added into a solution containing 10 g of sulfonated polyester having a hydroxyl group or an acid group at the end (AQ55S, available from Eastman) with a solid content of about 50 W %, and the similar steps as described in the aforementioned examples are performed to obtain a first mixed solution.

Then, 3.13 g of an amino-based crosslinking agent (melamine)(Cymel 1158, available from Allnex) and an adequate amount of a coagent (e.g., a combination of a polymer-based coagent and a polyether modified organic silicone-based coagent added to facilitate coating) were added the first mixed solution to form a mixture, and then the mixture was stirred for a while to form a second mixed solution. The second mixed solution included an ion exchange resin, and had a solid content of about 40%-60%.

Next, a fiberglass cloth having a thickness of about 90 μm was dipped in the second mixed solution (4.9 cm/min coating rate of the dip coating machine), followed by baking at about 120° C. for 200 minutes and at about 180° C. for 90 minutes, thereby forming a cured film containing an ion exchange resin.

Afterwards, several tests (including observations and measurements) were performed on the cured film fabricated by the method in Example 9. The test results are shown in Table 1 and described as follows:

(1) the cured film formed in Example 9 was observed by the naked eyes, and the appearance of the cured film was smooth and reflected a sheen;

(2) the salt absorption rate was about 7.13% (the cured film was dipped in a 0.5M saline solution for 24 hours);

(3) the cured film formed in Example 9 was dipped in the 0.5M saline solution for 24 hours, wherein the color of the 0.5M saline solution did not change and no eluted substance was observed in the 0.5M saline solution; and (4) the cured film formed in Example 9 was dipped in 0.01M NaOH aqueous solution (pH12) for 24 hours, wherein the color of the 0.01M NaOH aqueous solution did not change and no eluted substance was observed in the 0.01M NaOH aqueous solution.

Accordingly, the cured film containing the ion exchange resin fabricated by the method in Example 9 is an intact film without any defect and also passes the tests of chemical resistance. For example, the cured film was dipped in a saline solution or an alkaline aqueous solution for 24 hours, and the results show that no substance was eluted in the solution or no color change of the solution was observed. Therefore, the cured film fabricated by the method in Example 9 is suitable for use as an ion exchange membrane.

Comparative Example 1

Several tests (including observations and measurements) were performed on a commercially available cation exchange membrane (F)(Type-2, available from Fuji, Japan). The test results are shown in Table 1 and described as follows:

(1) the cation exchange membrane in Comparative Example 1 was dipped in a 0.5M saline solution for 24 hours, and no eluted substance was observed in the 0.5M saline solution;

(2) the swelling ratio was about 2.5%;

(3) the permselectivity was about 98.4%;

(4) the cation exchange membrane in Comparative Example 1 was dipped in 0.01M NaOH aqueous solution (pH12) for 24 hours, wherein the color of the 0.01M NaOH aqueous solution did not change and no eluted substance was observed in the 0.01M NaOH aqueous solution; and (5) the cation exchange membrane in Comparative Example 1 was dipped in 0.01M HCl aqueous solution (pH2) for 24 hours, wherein the color of the 0.01M HCl aqueous solution did not change and no eluted substance was observed in the 0.01M HCl aqueous solution.

Accordingly, the commercially available cation exchange membrane (F) passed the tests of chemical resistance, and also has good permselectivity. However, this commercially available cation exchange membrane (F) had a swelling ratio of 2.5%. Compared to the cured films fabricated by the method in Examples 1-9 having swelling ratios lower than 1%, the commercially available cation exchange membrane (F) has problems of being easily swelled and deformed during operation of the ED module.

Comparative Example 2

Several tests (including observations and measurements) were performed on another commercially available cation exchange membrane (S)(EI-A-200400-H, available from CENTURY ENVIRONTECH Co., Ltd). The test results are shown in Table 1 and described as follows:

(1) the cation exchange membrane in Comparative Example 2 was dipped in a 0.5M saline solution for 24 hours, and no eluted substance was observed in the 0.5M saline solution;

(2) the swelling ratio was about 4.5%;

(3) the permselectivity was about 91.7%;

(4) the cation exchange membrane in Comparative Example 2 was dipped in 0.01M NaOH aqueous solution (pH12) for 24 hours, wherein the color of the 0.01M NaOH aqueous solution did not change and no eluted substance was observed in the 0.01M NaOH aqueous solution; and (5) the cation exchange membrane in Comparative Example 2 was dipped in 0.01M HCl aqueous solution (pH2) for 24 hours, wherein the color of the 0.01M HCl aqueous solution did not change and no eluted substance was observed in the 0.01M HCl aqueous solution.

Accordingly, the commercially available cation exchange membrane (S) passed the tests of chemical resistance, and also had good permselectivity. However, this commercially available cation exchange membrane (S) had a swelling ratio of 4.5%. Compared to the cured films fabricated by the methods in Examples 1-9 having swelling ratios lower than 1%, the commercially available cation exchange membrane (S) has problems of being easily swelled and deformed during operation of the ED module.

Comparative Example 3

15.7 parts by weight of sulfonated polyester having a hydroxyl group or an acid group at the end (AQ48, available from Eastman) and 26.7 parts by weight of N,N-Dimethyl acetamid (DMAC) were mixed to form a mixture. Then, 6.79 g of a phenol-based crosslinking agent (PR722, available from Allnex) and an adequate amount of a coagent (e.g., a combination of a polymer-based coagent and a polyether modified organic silicone-based coagent added to facilitate coating) were added into the mixture. The mixture was stirred for a while to form a coating solution having a solid content of about 40%-60%.

Next, a non-woven cloth was dipped in the coating solution, followed by baking at about 150° C. for 30 minutes and at about 180° C. for 60 minutes, thereby forming a cured film.

Afterwards, several tests (including observations and measurements) were performed on the cured film fabricated by the method in Comparative Example 3. The test results are shown in Table 1 and described as follows:

(1) the cured film fabricated by the method in Comparative Example 3 was observed by the naked eyes, and the appearance of the hardened film reflects a sheen; however, the cured film was not smooth and a bit shrunk;

(2) the salt absorption rate was about 68.62% (the cured film was dipped in a 0.5M saline solution for 24 hours);

(3) after the cured film fabricated by the method in Comparative Example 3 was dipped in 0.01M NaOH aqueous solution (pH12) for 24 hours, breakages of the cured film were observed; and (4) after the cured film fabricated by the method in Comparative Example 3 was dipped in 0.01M HCl aqueous solution (pH2) for 24 hours, breakages of the cured film were observed.

Accordingly, the method in Comparative Example 3 does not use an epoxy compound (such as epoxy resin), and the fabricated cured film had an uneven appearance and a weak film strength. Therefore, the cured film fabricated by the method in Comparative Example 3 did not pass the chemical resistance tests.

Comparative Example 4

50 parts by weight of sulfonated polyester having a hydroxyl group or an acid group at the end (AQ48, available from Eastman) and 69.5 parts by weight of N,N-Dimethyl acetamid (DMAC) were mixed to form a mixture. Then, 1.32 parts by weight of benzene-1,2,4,5-tetracarboxylic dianhydride (PMDA) was added into the mixture to form a solution. The solution was heated to 130° C. for 3 hours to react and form a solution containing an ionic compound (i.e., the first Intermediate). Then, the solution containing the ionic compound was cooled to 90° C.

Next, 29.41 parts by weight of epoxy resin (epoxy equivalent EEW=215 g/eq) was dissolved in 29.41 parts by weight of N,N-Dimethyl acetamid (DMAC), followed by adding the solution containing the ionic compound (i.e. the first Intermediate) to form a solution. The solution was heated to 90° C. to react for 2 hours, and then cooled to room temperature, thereby obtaining a first mixed solution. This first mixed solution was a homogeneous solution of an alkyd resin, which was a dark amber liquid in a fluid state.

Then, an adequate amount of a coagent (e.g. a combination of a polymer-based coagent and a polyether modified organic silicone-based coagent added to facilitate coating) were added into 10 g of the first mixed solution (dark amber liquid) to form a mixture, and then the mixture was stirred for a while to form a coating solution having a solid content of about 40%-60%.

Next, a fiberglass cloth having a thickness of about 90 μm was dipped in the coating solution (4.9 cm/min coating rate of the dip coating machine), followed by baking at about 150° C. for 10 minutes and at about 180° C. for 60 minutes, thereby forming a film.

Afterwards, several tests (including observations and measurements) were performed on the film fabricated by the method in Comparative Example 4. The test results are shown in Table 1 and described as follows:

(1) the film fabricated by the method in Comparative Example 4 was observed by the naked eyes, and the appearance of the film was smooth and reflected a sheen;

(2) the salt absorption rate was about 39.82% (the film was dipped in a 0.5M saline solution for 24 hours), and the 0.5M saline solution becomes turbid (i.e. the film appears to be dissolved in the saline solution);

(3) after the film fabricated by the method in Comparative Example 4 was dipped in 0.01M NaOH aqueous solution (pH12) for 24 hours, breakages of the film were observed; and (4) after the film fabricated by the method in Comparative Example 4 was dipped in 0.01M HCl aqueous solution (pH2) for 24 hours, breakages of the film were observed.

Accordingly, the method in Comparative Example 4 does not use any crosslinking agent. Even though the fabricated film fabricated by the method in Comparative Example 4 had a smooth appearance, it did not pass the chemical resistance tests.

TABLE 1

|  | sulfonated polyester AQ48 | sulfonated polyester AQ55S | epoxy resin EEW: 177 | epoxy resin EEW: 180 | epoxy resin EEW: 215 | epoxy resin EEW: 350 | epoxy resin EEW: 650 |
| --- | --- | --- | --- | --- | --- | --- | --- |
| Example 1 | 70 | — | — | — | 20 | — | — |
| Example 2 | — | 80 | — | — | 18 | — | — |

TABLE 1-continued

| | | | | | | | |
|---|---|---|---|---|---|---|---|
| Example 3 | — | 80 | — | — | 18 | — | — |
| Example 4 | 88 | — | 5 | 17 | — | — | — |
| Example 5 | 70 | — | — | 17 | — | 5 | — |
| Example 6 | — | 88 | 12 | 5.6 | — | — | — |
| Example 7 | — | 88 | 12 | 5 | — | — | — |
| Example 8 | — | 50 | — | — | — | — | 30 |
| Example 9 | — | 5 g | — | — | — | — | 2.4 g |
| Comparative Example 1 | — | — | — | — | — | — | — |
| Comparative Example 2 | — | — | — | — | — | — | — |
| Comparative Example 3 | 15.7 | — | — | — | — | — | — |
| Comparative Example 4 | 50 | — | — | — | 29.41 | — | — |

| | phenol-based crosslinking agent | amino-based crosslinking agent (melamine) | HCl (aq) (pH 2) | NaOH (aq) (pH 12) | Swelling ratio | Permselectivity | ED desalination |
|---|---|---|---|---|---|---|---|
| Example 1 | 0.85 g | — | pass | pass | 0.2% | 97.2% | applicable |
| Example 2 | 0.85 g | — | Pass | pass | 0.43% | 93.9% | applicable |
| Example 3 | — | 0.64 g | pass | pass | 0.26% | 93% | applicable |
| Example 4 | — | 0.83 g | pass | pass | 0.1% | 92.7% | applicable |
| Example 5 | — | 0.85 g | pass | pass | — | — | applicable |
| Example 6 | — | 0.52 g | Pass | pass | — | — | applicable |
| Example 7 | — | 0.52 g | pass | pass | — | — | applicable |
| Example 8 | — | 0.81 g | pass | pass | — | — | applicable |
| Example 9 | — | 3.13 g | not tested | pass | — | — | applicable |
| Comparative Example 1 | — | — | pass | pass | 2.5% | 98.4% | applicable |
| Comparative Example 2 | — | — | pass | pass | 4.5% | 91.7% | applicable |
| Comparative Example 3 | 6.79 g | — | Film breakage | Film breakage | not tested | not tested | not tested |
| Comparative Example 4 | — | (no crosslinking agent) | Film breakage | Film breakage | not tested | not tested | not tested |

* The glass transition temperature (Tg) of sulfonated polyester AQ55S is 55° C.
* The glass transition temperature (Tg) of sulfonated polyester AQ48 is 48° C.
* The numerical units of sulfonated polyester and epoxy resin in Examples 1-8 and Comparative Examples 3-4 are parts by weight. The numerical units of sulfonated polyester and epoxy resin in Example 9 are grams (g).

According to the aforementioned descriptions, an ion exchange resin of some embodiments is formed by a composition, wherein the composition includes a crosslinking agent and an ionic compound with sulfonate ions. The ionic compound with sulfonate ions is formed by reacting an epoxy resin with an ionic monomer or an ionic polymer having sulfonate ions, wherein the ionic monomer and the ionic polymer each has a hydroxyl group or an acid group at one end. According to the embodiments, the ionic monomer or the ionic polymer having sulfonate ions is reacted with the epoxy resin to form an ionic compound having several crosslinking points; then, the ionic compound having several crosslinking points is reacted with a crosslinking agent to form an ion exchange resin having a network structure. Accordingly, films containing the ion exchange resin of the embodiments have improved properties of chemical resistance. Therefore, the ion exchange resin and methods for preparing the same according to the embodiments can be utilized to form the films with excellent properties. For example, the films as formed have smooth and intact appearances, and also pass several of chemical resistance tests. For example, the embodied cured film was dipped in a saline solution, an acidic aqueous solution or an alkaline aqueous solution for 24 hours, and the results show that no substance was eluted in the solution or no color change of the solution was observed. Also, the films including the ion exchange resin in the embodiments have good properties of extremely low swellability; for example, the swelling ratios of the films are lower than 1%. In some embodiments, the films fabricated by the methods provided herein has swelling ratios lower than 0.5%, even lower than 0.1%. Therefore, compared to the commercially available films having swelling ratios up to 2.5% and 4.5%, the ion exchange resin provided in some embodiments have greatly decreased the swelling ratios of the films. Also, the film fabricated by the method of the embodiment has an excellent permselectivity and good desalination efficiency in electrodialysis (ED). Therefore, the films including the ion exchange resin in the embodiments have good properties such as high strength, good chemical resistance, high permselectivity and extremely low swelling ratio. Thus, those films fabricated by the methods of the embodiments are suitable for use as ion exchange membranes, and those films would not be easily swelled and deformed during operation of the ED module.

It will be clear that various modifications and variations can be made to the disclosed methods and materials. It is intended that the specification and examples be considered as exemplary only, with the true scope of the disclosure being indicated by the following claims and their equivalents.

What is claimed is:

1. An ion exchange resin, formed by a composition, and the composition comprising a crosslinking agent and an ionic compound with sulfonate ions, wherein the ionic compound with sulfonate ions is formed by reacting an epoxy resin with an ionic monomer or an ionic polymer having sulfonate ions, wherein the ionic monomer and the ionic polymer each has a hydroxyl group or an acid group at one end, and the ionic monomer or the ionic polymer is 40 to 80 parts by weight and the epoxy resin is 15 to 25 parts by weight, based on 100 parts by weight of the ion exchange resin, wherein the ion exchange resin has a network structure.

2. The ion exchange resin as claimed in claim 1, wherein the crosslinking agent of the composition is 5 to 15 parts by weight, based on 100 parts by weight of the ion exchange resin.

3. The ion exchange resin as claimed in claim 1, wherein the ionic polymer has a structure represented by Formula (I):

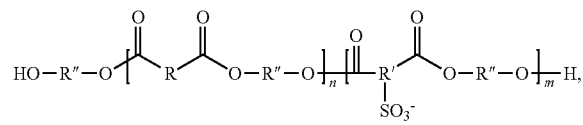

Formula (I)

wherein R, R' and R" are independently $C_1$-$C_8$ alkyl group, $C_1$-$C_8$ cycloalkyl group, $C_1$-$C_{10}$ phenyl group, $C_1$-$C_8$ alkoxy group, $C_1$-$C_8$ alkoxyalkyl group, $C_1$-$C_8$ phenoxyalkane group, or $C_1$-$C_8$ alcohol ether, m is a positive integer from 1 to 500 and n is a positive integer from 1 to 500.

4. The ion exchange resin as claimed in claim 1, wherein the ionic polymer is a sulfonated polyester having the hydroxyl group or the acid group at the end, wherein the sulfonated polyester has a number average molecular weight (Mn) from 5,000 to 15,000.

5. The ion exchange resin as claimed in claim 1, wherein the epoxy resin has two or more functional groups.

6. The ion exchange resin as claimed in claim 1, wherein the epoxy resin has an epoxy equivalent in a range of 150 g/eq to 800 g/eq.

7. The ion exchange resin as claimed in claim 1, wherein the epoxy resin has an epoxy equivalent in a range of 150 g/eq to 650 g/eq.

8. The ion exchange resin as claimed in claim 1, wherein the crosslinking agent is a phenol-based crosslinking agent, an amino-based crosslinking agent, a diisocyanate-based crosslinking agent, or a combination thereof.

9. The ion exchange resin as claimed in claim 8, wherein the amino-based crosslinking agent is a melamine based crosslinking agent, a primary ammonium salt, a secondary ammonium salt, or a combination thereof.

10. The ion exchange resin as claimed in claim 1, wherein the crosslinking agent has two or more functional groups.

11. A method for preparing an ion exchange resin, comprising:
mixing a solvent, an epoxy resin, and an ionic monomer sulfonate ions or an heating to form a first mixed solution, wherein the ionic monomer and the ionic polymer each has a hydroxyl group or an acid group at one end, and the first mixed solution comprises an ionic compound having sulfonate ions, wherein the ionic monomer or the ionic polymer is 40 to 80 parts by weight and the epoxy resin is 15 to 25 parts by weight, based on 100 parts by weight of the ion exchange resin;
mixing the first mixed solution and a crosslinking agent to form a second mixed solution; and
performing a crosslinking reaction to form the ion exchange resin having a network structure.

12. The method for preparing the ion exchange resin as claimed in claim 11, wherein the crosslinking agent is 5 to 15 parts by weight, based on 100 parts by weight of the ion exchange resin.

13. The method for preparing the ion exchange resin as claimed in claim 11, wherein the ionic polymer has a structure represented by Formula (I)

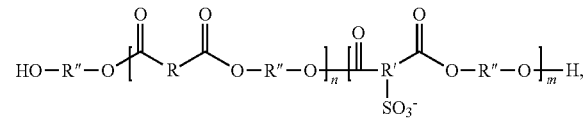

Formula (I)

wherein R, R' and R" are independently $C_1$-$C_8$ alkyl group, $C_1$-$C_8$ cycloalkyl group, $C_1$-$C_{10}$ phenyl group, $C_1$-$C_8$ alkoxy group, $C_1$-$C_8$ alkoxyalkyl group, $C_1$-$C_8$ phenoxyalkane group, or $C_1$-$C_8$ alcohol ether, m is a positive integer from 1 to 500.

14. The method for preparing the ion exchange resin as claimed in claim 11, wherein the ionic polymer is a sulfonated polyester having the hydroxyl group or the acid group at the end, wherein the sulfonated polyester has a number average molecular weight (Mn) from 5,000 to 15,000.

15. The method for preparing the ion exchange resin as claimed in claim 11, wherein the epoxy resin has an epoxy equivalent in a range of 150 g/eq to 800 g/eq.

16. The method for preparing the ion exchange resin as claimed in claim 11, wherein the epoxy resin has an epoxy equivalent in a range of 150 g/eq to 650 g/eq.

17. The method for preparing the ion exchange resin as claimed in claim 11, wherein the crosslinking agent is a phenol-based crosslinking agent, an amino-based crosslinking agent, a diisocyanate-based crosslinking agent, or a combination thereof.

* * * * *